United States Patent [19]

Bontje et al.

[11] 4,452,303

[45] Jun. 5, 1984

[54] DEVICE AND A METHOD FOR RECOVERING HEAT FROM THE SOIL

[75] Inventors: Theodorus P. M. Bontje, Lg Dedemsvaart; Gerrit Schuldink, Ommen; Gerrit H. Heetbrink, Ag Dalfsen; Warner J. de Putter, An Hardenberg; Bernardus H. Kok, Za Lutten, all of Netherlands

[73] Assignee: Wavin B. V., Zwolle, Netherlands

[21] Appl. No.: 289,900

[22] Filed: Aug. 4, 1981

[30] Foreign Application Priority Data

Aug. 7, 1980 [NL] Netherlands ............... 8004513
Aug. 7, 1980 [NL] Netherlands ............... 8004509

[51] Int. Cl.³ .................. F24J 3/02; F28D 7/12
[52] U.S. Cl. ................................ 165/142; 165/45
[58] Field of Search ........... 165/45, 141, 142, 48, 165/180; 285/423, 133 R, 137 R

[56] References Cited

U.S. PATENT DOCUMENTS

| | | | |
|---|---|---|---|
| 1,981,730 | 11/1934 | Hankins | 165/45 |
| 2,665,556 | 1/1954 | Otten | 165/142 X |
| 2,712,223 | 7/1955 | Hunt et al. | 165/141 X |
| 2,730,083 | 1/1956 | Kremser | 165/142 X |
| 3,976,129 | 8/1976 | Silver | 165/154 |
| 3,991,822 | 11/1976 | Morris | 165/140 |
| 4,030,549 | 6/1977 | Bouck | 165/45 X |
| 4,286,651 | 9/1981 | Steiger et al. | 165/45 |

FOREIGN PATENT DOCUMENTS

| | | | |
|---|---|---|---|
| 1059847 | 11/1953 | France | 285/133 R |
| 2357721 | 2/1978 | France | 165/45 |

*Primary Examiner*—Sheldon J. Richter
*Attorney, Agent, or Firm*—Wilkinson, Mawhinney & Theibault

[57] ABSTRACT

A device and method for recovering heat from the soil and groundwater, comprise heat-exchanging means consisting of an inner tube, an outer tube and partitions forming longitudinal channels between said inner and outer tube.

An inlet for heat-exchanging fluid and an outlet for heat-exchanging fluid are present for conveying a heat-exchanging fluid through said longitudinal channels.

The heat-exchanging means are preferably placed in a perforated casing allowing passage of liquid but not of soil particles. The casing consists preferably of an outer casing tube and an inner casing tube, casing partitions providing longitudinal casing channels. For allowing passage of groundwater the outer casing tube and the inner casing tube are provided with perforations.

Heat is recovered by passing a heat-exchanging fluid through the casing channels.

3 Claims, 10 Drawing Figures

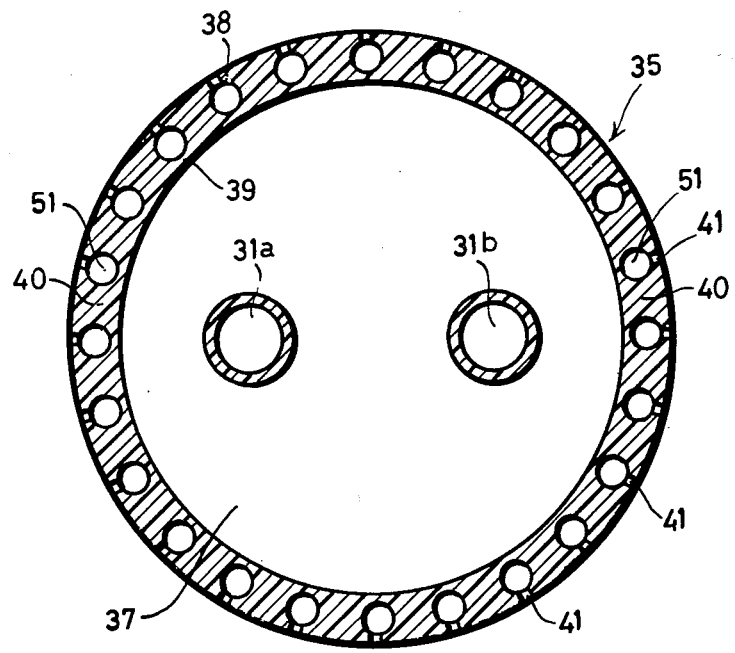
FIG: 7.
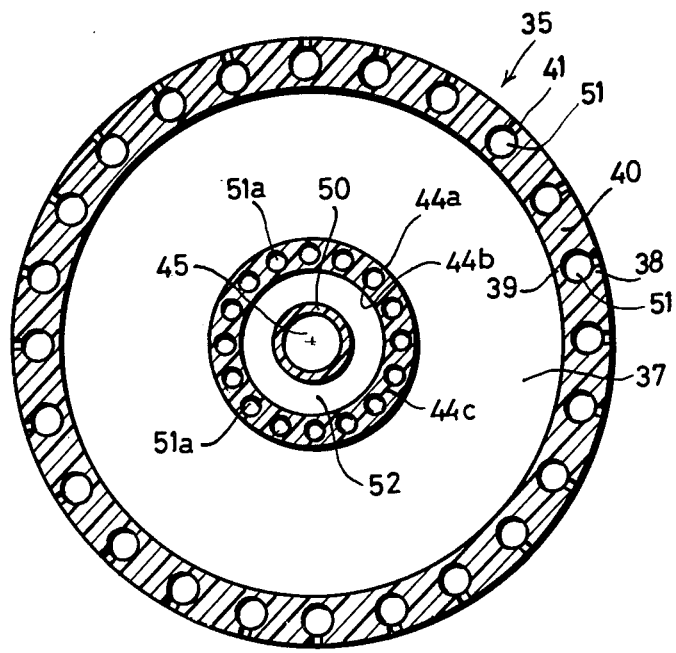
FIG: 9.

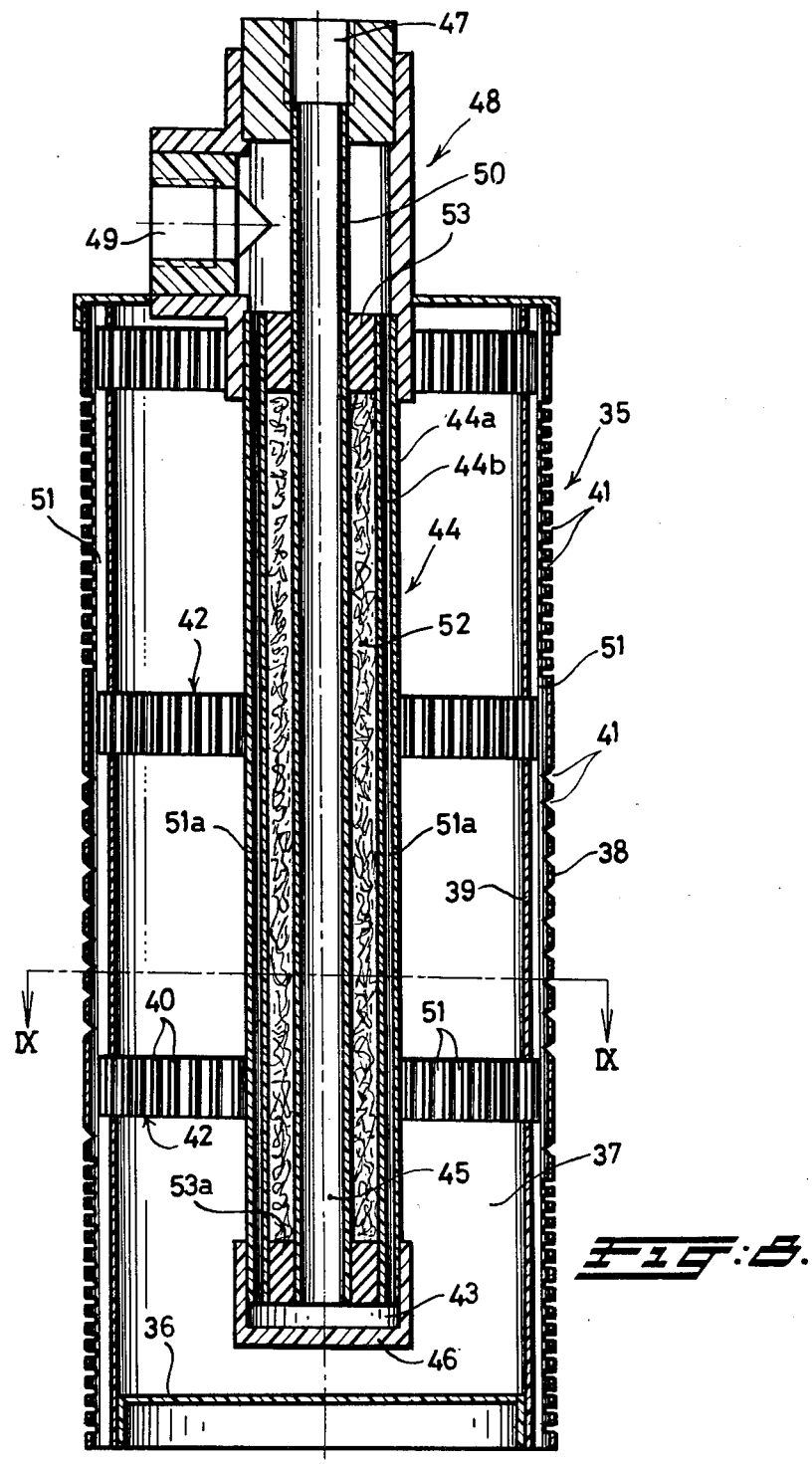

DEVICE AND A METHOD FOR RECOVERING HEAT FROM THE SOIL

BACKGROUND OF THE INVENTION

1. Field of the Invention.

The invention relates to a device for recovering heat from the soil comprising at least heat-exchanging means for absorbing heat from groundwater and the soil.

2. Description of the Prior Art.

A device of this type for recovering heat from the soil has been used in the art. In this known device a pipe is placed into the soil, whereupon, by using a pump, groundwater which has a higher temperature is pumped upwards from great depths, said heat being subsequently recovered by means of heat-exchanging surfaces. Thus, by taking advantage of the temperature of the groundwater or of the soil, it is possible to obtain considerable savings in the costs for heating buildings, houses, pavements, airports and the like.

A drawback of said devices is that groundwater is removed from the soil, which groundwater is usually discharged through the sewer system. In view of possible environmental disturbances, efforts have been made over the past few years to minimize the removal of groundwater from the soil, so that the aforesaid arrangements are unsuitable for the regular recovering of heat from the soil.

It has recently been proposed to overcome said drawbacks by carrying the pumped-up groundwater back into the soil in another place after having recovered the heat, but this also leads to great objections because of the resultant environmental pollution caused by microbes and the like.

SUMMARY OF THE INVENTION

It is therefore a primary object of the present invention to provide a device of the aforementioned type, in which said drawbacks do no occur, by using the groundwater only indirectly as a heating fluid that transfers its heat to a heat-exchanging fluid being recycled independently of the groundwater.

This object is attained according to the invention in that the heat-exchanging means comprise at least a pipe, preferably of plastics, adapted to transport a heat-exchanging fluid and of sufficient rigidity to be placed into the soil, said pipe being provided with an inlet and an outlet for heat-exchanging fluid.

In this way the groundwater in the soil or the soil itself exchanges heat with a heat-exchanging fluid flowing through said pipe, without pumping up said groundwater and thus avoiding environmental disturbances.

In a preferred embodiment of the invention the device comprises an outer tube having a closed bottom, as well as an inner tube concentrically disposed therein whose inside is in open communication with the annular space provided between the inner and outer tubes, while the inlet for the heat-exchanging fluid opens into the said annular space and into the inner tube respectively, and the outlet for the heat-exchanging fluid opens into the inner tube and into the said annular space respectively.

When using such a device, the heat-eschanging fluid is made to pass through an annular space whose outer side is in connection with the surrounding soil, so that heat can be transferred from the soil and the groundwater to the heat-exchanging fluid. This heat-exchanging fluid is subsequently carried off through the inside of the inner tube and can then be used for heating purposes by heating, either indirectly or directly, heating installations.

In order to obtain an optimum heat-exchange it may be desirable to have the heat-exchanging fluid flow in through the inner tube and to carry it off through said annular space.

The annular space is very advantageously provided with liquid-turbulence generating means, as these ensure an optimum exchange of heat from the groundwater or from the soil to the said heat-exchanging fluid which is not in contact with the groundwater or the soil.

These liquid-turbulence generating means conveniently consist of partitions dividing the annular space into channels, said partitions preferably being integral with the inner and outer tubes.

When using such partitions which are integral with an inner tube and an outer tube, it is possible to use existing pipes or tubes for making the device according to the invention.

The partitions effectively form, together with the wall portions of the inner tube and the outer tube, channels having rounded, preferably approximately circular, cross-sections, the cross-section of the channels being effectively small relative to the cross-section of the total annular space. Thus, there is obtained an optimum turbulent flow in the annular space wherein the exchange of heat between the groundwater and the heat-exchanging fluid takes place, and an optimum conservation of heat in the heat-exchanging fluid during the subsequent transport through the inner side of the inner tube.

In order to prevent a heat-exchange from occurring between the heat-exchanging fluid flowing in and the heat-exchanging fluid flowing out which has higher temperatures, the inner tube is effectively provided on its inner side with a heat-insulating layer, said heat-insulating layer being effectively provided at its extremities with sealing means of an elastic material so as to prevent the heat-exchanging fluid from acting between the inner surface of the inner tube and the outer surface of the insulating layer.

In order to obtain an optimum heat-exchange with the heat-exchanging fluid it is recommended to place said pipe for transporting the heat-exchanging fluid in a mass of groundwater.

In many cases this is hard to achieve and thus the pipe is located exclusively in moist soil thus preventing an optimum recovery of heat.

It is therefore another object of the present invention to provide a device which does not have this drawback.

This object is attained according to the invention in that said pipe for transporting heat-exchanging fluid is placed into a perforated casing which, substantially, does not allow soil particles to get through.

In this manner groundwater is allowed to accumulate within the casing by passing through the perforations, the resultant water mass ensuring an optimum exchange of heat because the pipe receives optimum moistening from the groundwater.

In a particularly advantageous embodiment the casing consists of a composite tube having longitudinal casing channels in the wall, the outer casing wall of said longitudinal casing channels being perforated and the inner sides thereof leading through openings into the interior of the composite tube, the bottom of the composite tube being closed off and continuous openings being provided between the inner side and the outer side of the composite tube.

The perforations in the outer wall afford groundwater to penetrate into the longitudinal casing channels, the groundwater being sucked into the longitudinal casing channels due to capilary action and subsequently flowing into the interior of the composite tube through openings provided therefore.

The heat-exchanging fluid transported through the pipe then absorbs heat from said accumulated water mass, thus causing the density of the water to increase. As a result, the colder groundwater will be expelled from the interior of the casings through the continuous openings, while fresh hotter groundwater will accumulate around the pipe adapted to transport the heat-exchanging fluid.

The invention furthermore relates to a method of recovering heat from the soil and groundwater, said method being effected in that a heat-exchanging fluid is passed through a device according to the invention, particularly a device comprising an outer tube and an inner tube and transitions being positioned between said inner and outer tube in order to form channels for transporting heat-exchanging fluid.

The device and method of the invention offer the great advantage that heat can also be recovered from heated soil, wherein there is hardly any groundwater.

The heat-insulating layer which can be applied on to the inner face of the inner tube conveniently consists of reticulated polyethylene foam, polyurethane foam or the like, the inner and outer tubes advantageously consisting of impact-resistant polyvinyl chloride although polyethylene is also a suitable material.

As to said insulating layer used for insulating the inner face of the inner tube, it should be noted that this insulation is particularly needed when working with pipes driven into the soil to a depth of 20 to 25 meters.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 7 is a sectional view along line VII—VII in FIG. 6;

FIG. 8 is a sectional view of a fifth embodiment of a device according to the invention;

FIG. 9 is a cross-sectional view along line IX—IX in FIG. 8;

DESCRIPTION OF THE PREFERRED EMBODIMENTS

Figure 1:
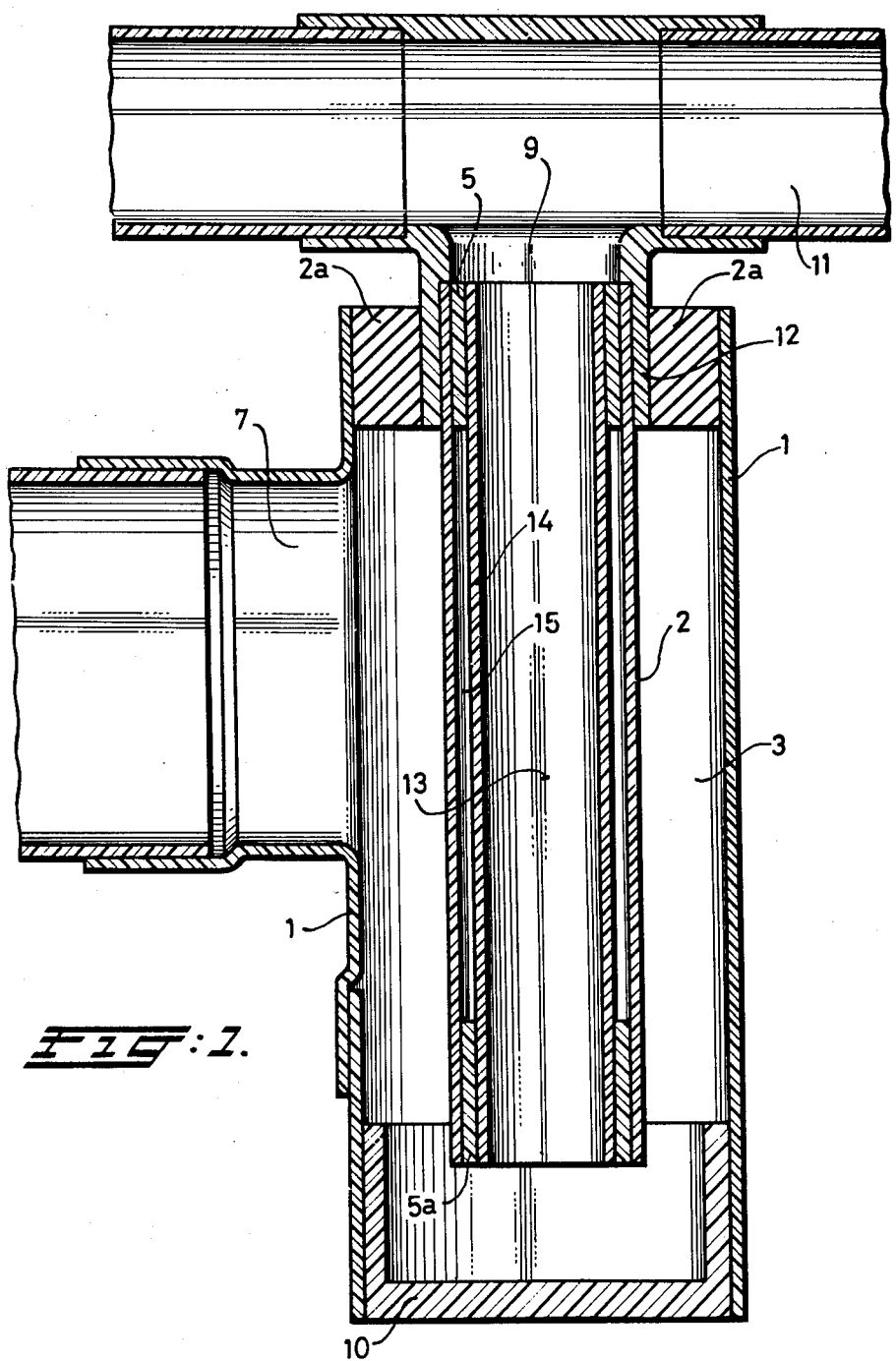
FIG. 1 is a first embodiment of a device according to the invention.

Initially referring to FIG. 1 a first embodiment of the device of the invention, comprises an outer tube 1 of plastic, for example, impact-resistant polyvinyl chloride.

At its end said outer tube 1 is closed by means of a cap 10 also of impact-resistant polyvinyl chloride.

The outer tube 1 is provided with an inlet 7 for supplying a heat-exchanging fluid to an annular space 3 formed between the outer tube 1 and an inner tube 2 concentrically disposed within the inner tube 1.

The free cross-section on the outer side of the inner tube 2 is such that the heat-exchanging fluid supplied through the inlet 7 to the annular space 3 is carried off in a laminar flow through the outlet 9, wherefrom the heat-exchanging fluid may flow to heat-absorbing elements through conduit 11.

In order to maintain the inner tube 2 in its position, this inner tube 2 is fixedly secured in the protruding portion 12 of a T-piece which in turn is retained, in relation to the outer tube 1, by a holding means 2a in the form a rubber ring.

In order to prevent an undesirable exchange of heat from the heat-exchanging fluid that has absorbed heat in the annular space 3, another tube 14 may be effectively fitted within the inner tube 2 and retained by sealing rings 5 and 5a.

The space 15 formed between the inner tube 2 and the tube 14 may be filled with a foam-plastic insulating material, if desired.

Figure 2:
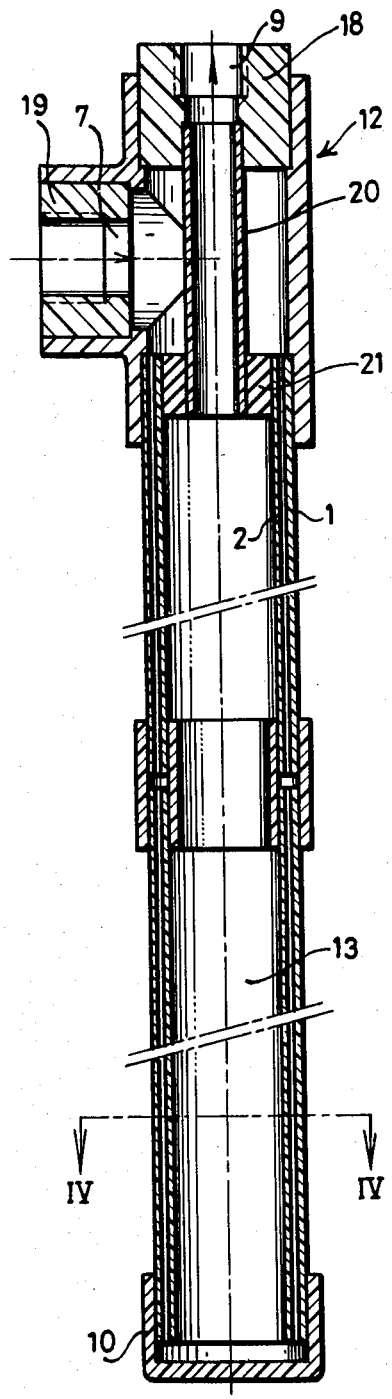
FIG. 2 is a second embodiment of a device according to the invention.

Referring now to FIG. 2 a preferred embodiment, comprises an outer tube 1 and an inner tube 2 being interconnected by means of partitions 16, thus forming channels 17 (vide FIG. 4), so that the heat-exchanging fluid supplied through inlet 7, flows downwards through said channels and is heated by the exchange of heat with the surrounding soil and ground water. Preferably the partitions 16 are integral with the outer tube 1 and the inner tube 2, but it is also possible to use an inner tube 2 being provided with integral projections forming the partitions when such a pipe is placed into an outer tube 1.

The channels 17 are effectively rounded and preferably have a circular cross-section.

The free cross-section 13 of the inner tube 2 is preferably dimensioned in such a way that, after absorbing heat in the channels 17, the heat-exchanging fluid flows to the outlet 9 in a laminar flow.

For an outer tube 1 of impact-resistant polyvinyl chloride (inner diameter 41 mm, outer diameter 50 mm) having forty-seven channels 16 (channel diameter 2 mm) in the wall and a yield in water as heat-exchanging fluid of 0.15 m³/h, the rate of inflow is 0.3 m/sec. and the rate of outflow is 0.03 m/sec.

Preferably a T-piece is used having a separate outlet conduit 18, forming the outlet 9, and a separate conduit 19 providing the inlet 7.

In order that the heat-exchanging fluid flowing upwards through the inside of the inner tube 2 is prevented from getting into contact with the heat-exchanging fluid flowing in, a closing means 21 cooperates with a tube 20 communicating with the outlet 9.

Figure 3:
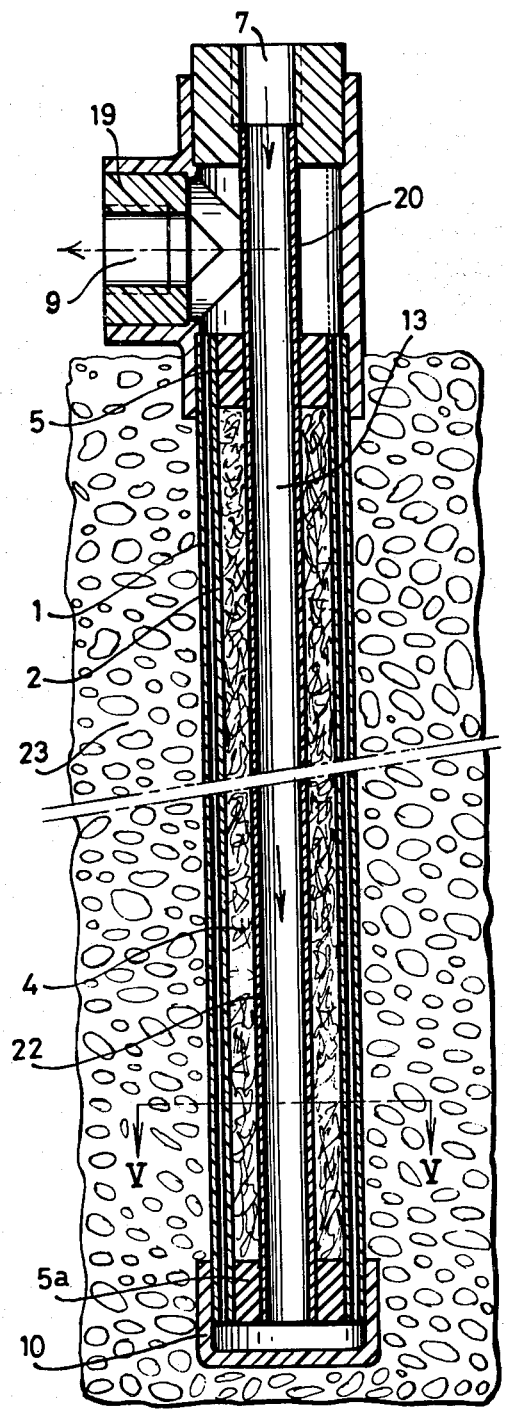
FIG. 3 is a third embodiment of a device according to the invention.

Referring now to FIG. 3 the same form of constructions is shown as in FIG. 1, in this case a foam plastic layer 4 being provided, however, on the inner side of the inner tube 2. This foam plastic layer is covered by another inner tube 22 of polyethylene (inner diameter 16 mm and outer diameter 20 mm) being integral with the tube 20 and connected to the inlet 7. The foam as used is reticulated polyethylene foam.

In this case the inlet 7 communicates with the inner tube 22 and the outlet 9 communicates with the channels 17.

This embodiment is, for instance, very suitable for heat recovery, since colder groundwater from which heat has been recovered will, on account of its greater density, accumulate at a lower level and the hotter groundwater will, on account of its lower density, accumulate at a higher level.

The heat-exchanging fluid will then first come into contact. with the colder groundwater and subsequently with the hotter groundwater.

The inner and outer tubes, which are joined together by the partitions 16 to form an integral pipe, advantageously consist of impact-resistant polyvinyl chloride, the diameter of the composite tube being approximately 50 mm.

This value is, however, not a limitation to the subject matter of the present invention.

As far as the foregoing refers to annular spaces, it is obvious that said spaces also comprises spaces whose cross-sections are not circular, but rounded, angular or formed in any other manner.

In order to improve groundwater circulation it may be worthwhile to surround the outer tube 1 with a porous medium, for example a layer of gravel 23.

Figure 4:
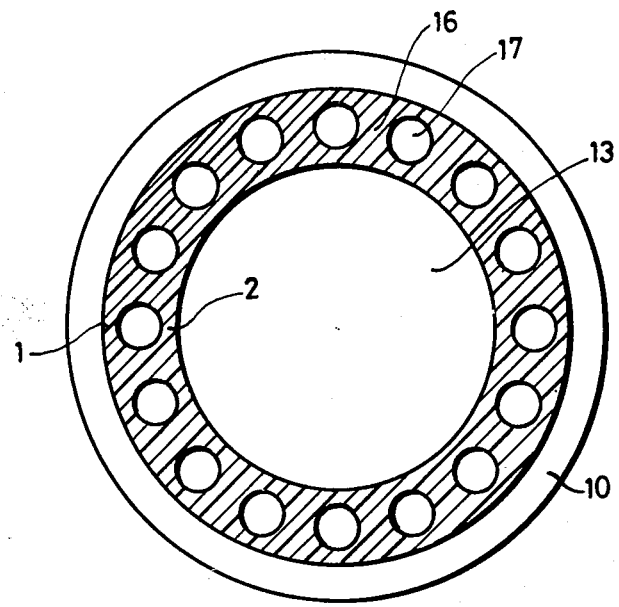
FIG. 4 is a cross-sectional view according to line IV—IV in FIG. 2.
Figure 5:
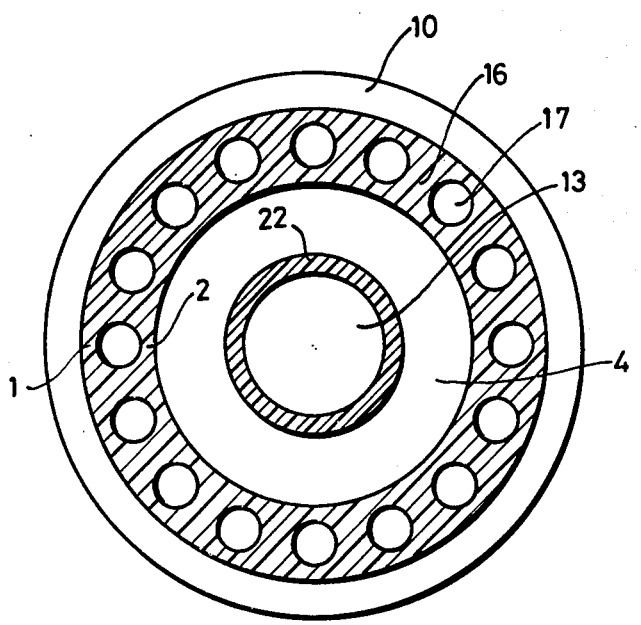
FIG. 5 is a cross-sectional view according to line V—V in FIG. 3.

As stated hereinbefore FIGS. 4 and 5 are cross-sectional views of lines IV—IV and V—V in FIGS. 2 and 3.

Figure 6:
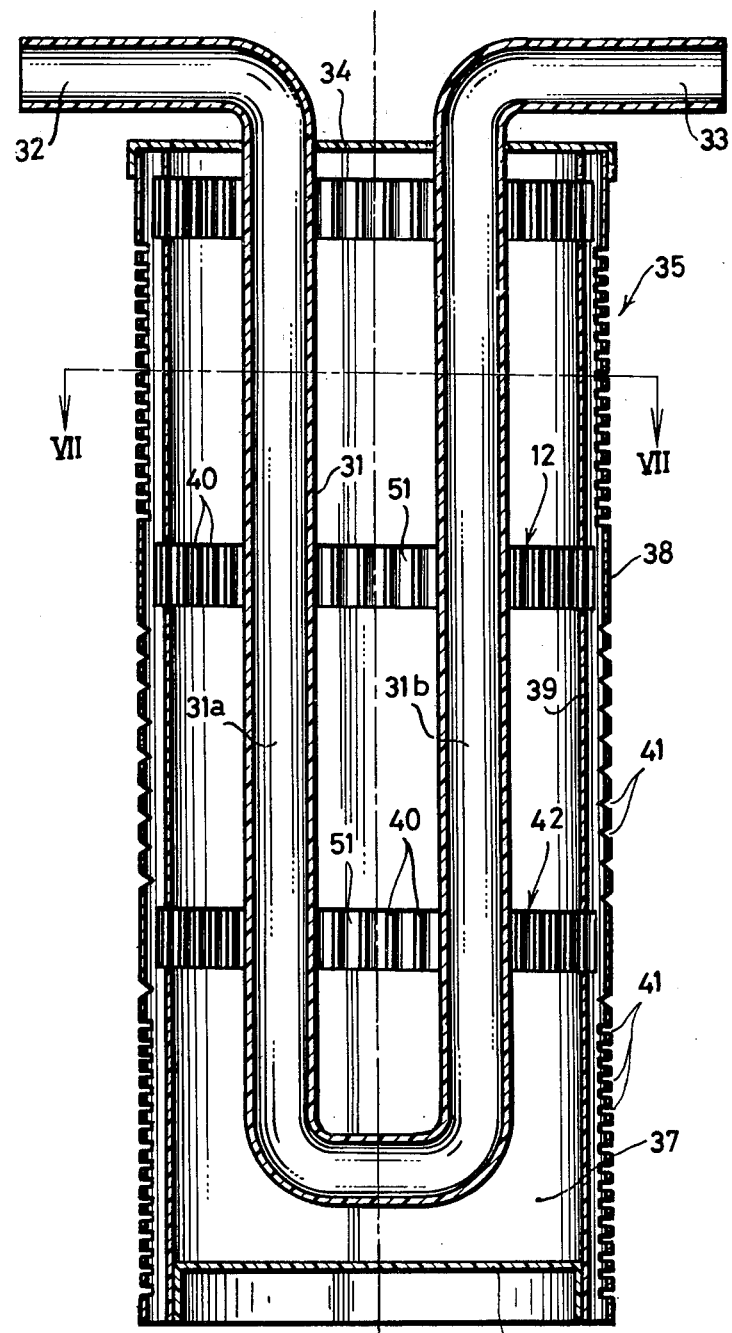
FIG. 6 is a fourth embodiment of a device according to the invention.

Referring to FIG. 6 a pipe 31 in the form of a U-tube is provided with an inlet 32 and an outlet 33. A heat-exchanging fluid is in the form of water, to which anti-freeze agents having been added, supplied to the pipe 31 through the inlet 32 and is carried off through outlet 33. After heat delivery, the heat-exchanging fluid carried off through the outlet 33 can be carried back to the inlet 32 and so be used again for heat absorption. The descending part of the pipe is indicated by 31a, the ascending part by 31b.

The pipe 31 is secured in the top side 34 of a casing 35 surrounding the pipe. The bottom side of the casing 35 is closed off by means of a sieve 36 the casing 35 being driven into the soil in such a manner that soil particles cannot pass into the interior of the casing 35 through the sieve bottom 36.

The casing 35 consists of an outer casing tube 38 and an inner casing tube 39 which are interconnected by means of casing partitions 40, thereby forming first longitudinal casing channels 51. On their outerside said longitudinal casing channels are provided with transverse grooves 41.

Said grooves 41 afford surrounding groundwater to penetrate therethrough into the longitudinal casing channels 51, while, since said longitudinal casing channels 51 have a small inner diameter, the groundwater penetrating into the longitudinal casing channels 51 will be subjected to capilary action therein, thus causing the water to rise in the channels 51.

On the inside the inner casing wall 39 of the casing 35 is provided with annular recesses 42, the partitions 40 being maintained. Water rising in the longitudinal casing channels 51 as a result of capilary action then flows into the interior 37 of the casing 35 and can here be subjected to a process of heat-exchange with the heat-exchanging fluid in the form of water supplied through pipe 31.

FIG. 7 is a sectional view along line VII—VII in FIG. 6.

Referring now to FIG. 8 a modified embodiment of a device according to FIG. 1 is shown, the casing 35 being formed in the same manner as in FIG. 6. The reference numerals in said FIG. 8 being denoted in the same manner as in FIG. 6.

In this case, however, on the inside of the porous casing 35 of polyvinyl chloride having a diameter of 80 mm, there is suspended a pipe 44 consisting of an outer tube 44a (outer diameter 50 mm) and inner tube 44b (diameter 41 mm) which jointly form an entity by partitions 44c. Thus longitudinal channels 51a are formed in the wall of the pipe 44 (length about 10 mm).

The bottom side of the pipe 44 is closed by means of a sealingly closing cover 46, leaving an annular opening 43, however, which ensures communication between other longitudinal channels 51a, and the interior 45 of the pipe 44.

The heat-exchanging fluid is carried off through outlet 49 provided in the T-piece 48; the intake proceeds through inlet 47, so that the heat-exchanging fluid engages at the end groundwater having the highest temperature. Said inlet 47 is connected to a polyethylene pipe 50 (outer diameter 20 mm and inner diameter 16 mm) located in the interior of pipe 44. Said pipe 44 comprising an inner wall 44b and an outer wall 44a as well as partitions 44c (vide FIG. 9), is used for the transport of the heat-exchanging fluid, said heat-exchanging fluid flowing through the longitudinal channels 51a.

In order to prevent the heat-exchanging fluid, after having absorbed heat in the channels 51a, from releasing said heat to the heat-exchanging fluid flowing in, there is advantageously provided on the inside of the inner tube 44b a foam layer 52 which in turn is covered by the polyethylene tube 50.

Sealing rings 53, 53a are provided for holding the polyethylene pipe 50.

Such an insulation is especially required when reaching depths of 20–25 meters.

It will be evident that the groundwater accumulating in the interior 37 of the porous casing 35 will acquire a greater density after releasing heat and so will flow from the casing, and will be replaced by hotter groundwater.

This brings about a natural circulation, in which the hot groundwater flows, through the channels 41, to the pipe 44 for heat-exchange.

This circulation can be appropriately improved by increasing the porosity of the surrounding soil. When driving the casing 45 into the soil there is generally produced a larger hole which is filled up with earth. By choosing for example gravel 54 as a filler (FIG. 10), it is possible to control the porosity as desired around the casing 35. The porosity of the soil 58 (FIG. 10) around said filler can be improved, if desired, by subjecting the casing 35 to a strong vacuum pressure during a certain time, i.e. before putting the tubes 31a, 31b and 44a, 44b, respectively into place.

Figure 10:
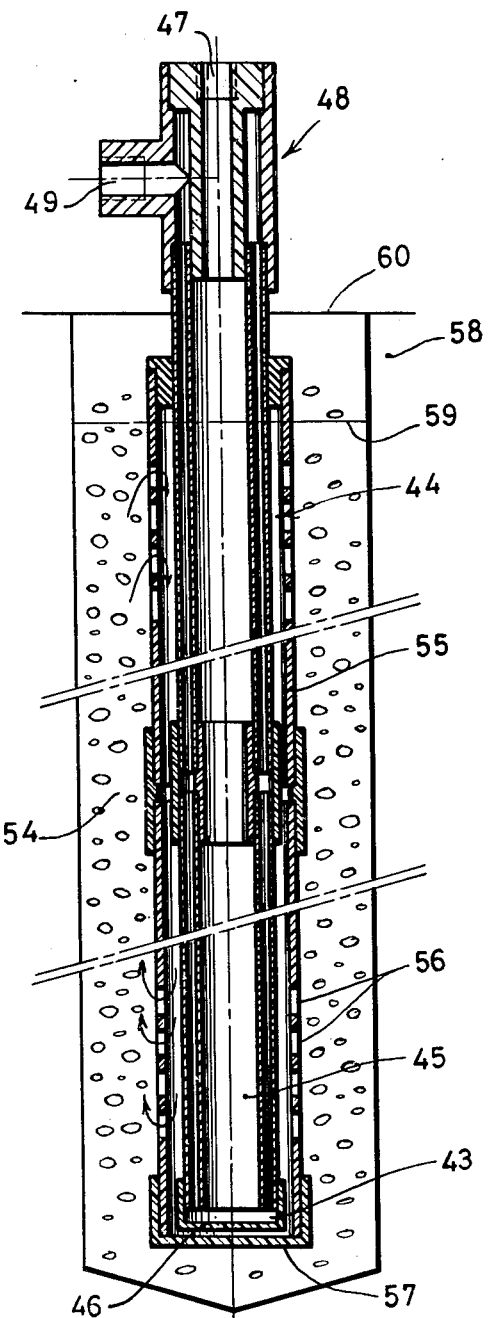
FIG. 10 is a sixth embodiment of a device according to the invention.

Referring now to FIG. 10 the casing may also consist of a single-walled tube 55 provided with grooves 56 or other openings; said single-walled tube then being closed off by a closed end cap 57.

The groundwater level is indicated by 59; this groundwater level lies for example 80 cm below the surface 60.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A heat exchange apparatus for absorbing heat from ground water and the soil, said heat exchange apparatus comprising
   (a) an outer plastic tube having a closed bottom,
   (b) an inner plastic tube concentrically disposed therein whose inner side is in open communication with an annular space defined between said inner and outer plastic tubes, said annular space being divided into channels by plastic partitions integral with said inner and outer tubes and being thin so that the total cross sectional area of said channels approximates the cross sectional area of said annular space, said channels being a plurality of round cross sections and being small relative to the cross section of the total annular space resulting in a laminar flow of liquid passed through said channels,
   (c) inlet means for leading a heat exchange fluid into said annular space and into said inner tube sequentially,
   (d) outlet means for leading said heat exchange fluid from within said inner concentric plastic tube and said annular space externally of the device, and said inner and outer plastic tubes being adapted to transport said heat exchange fluid being of sufficient rigidity to be placed in the soil.

2. A device according to claim 1, wherein the partitions form, together with the closed-in wall portions of the inner tube and the outer tube, channels having a rounded, substantially circular cross-section, the cross-section of the channels preferably being being small in relation to the cross-section of the total annular space.

3. A device according to claim 1, wherein the free cross-section of the inner tube with or without a heat-insulating layer having been applied thereon, results in a laminar flow of a liquid passed through the interior of the inner tube.

* * * * *